(12) United States Patent
Mohedas et al.

(10) Patent No.: US 8,778,178 B2
(45) Date of Patent: Jul. 15, 2014

(54) INTEGRATED MULTI-STEP SOLID/LIQUID SEPARATION SYSTEM FOR FISCHER-TROPSCH PROCESSES

(75) Inventors: Sergio Mohedas, Westminster, CO (US); Harold A. Wright, Longmont, CO (US)

(73) Assignee: Rentech, Inc., Los Angeles, CA (US)

( * ) Notice: Subject to any disclaimer, the term of this patent is extended or adjusted under 35 U.S.C. 154(b) by 216 days.

(21) Appl. No.: 12/577,488

(22) Filed: Oct. 12, 2009

(65) Prior Publication Data

US 2010/0113622 A1    May 6, 2010

Related U.S. Application Data

(60) Provisional application No. 61/104,816, filed on Oct. 13, 2008.

(51) Int. Cl.
*B03C 1/32* (2006.01)
*B01D 17/028* (2006.01)

(52) U.S. Cl.
USPC .......... 210/223; 210/695; 210/521; 210/222; 210/251; 210/513; 210/519

(58) Field of Classification Search
None
See application file for complete search history.

(56) References Cited

U.S. PATENT DOCUMENTS

| | | | |
|---|---|---|---|
| 3,676,337 A | 7/1972 | Kolm | |
| 4,605,678 A | 8/1986 | Brennan et al. | |
| 4,788,222 A * | 11/1988 | Rice et al. | 518/700 |
| 6,022,406 A | 2/2000 | Roux et al. | |
| 6,068,760 A | 5/2000 | Benham et al. | |
| 6,712,982 B2 | 3/2004 | Bohn et al. | |
| 6,833,078 B2 | 12/2004 | Espinoza et al. | |
| 6,929,754 B2 | 8/2005 | Espinoza et al. | |
| 7,078,439 B2 | 7/2006 | Odueyungbo et al. | |
| 2005/0035030 A1 * | 2/2005 | Oder et al. | 209/232 |
| 2006/0111232 A1 * | 5/2006 | Spena et al. | 502/29 |
| 2007/0056912 A1 * | 3/2007 | Oder et al. | 210/695 |
| 2007/0280864 A1 * | 12/2007 | Cross | 422/186.02 |
| 2009/0062108 A1 | 3/2009 | Demirel et al. | |

FOREIGN PATENT DOCUMENTS

JP    09313826 A    12/1997

OTHER PUBLICATIONS

Iacob, G., et al., High gradient magnetic separation ordered matrices, 2002, European Cells and Materials, vol. 3, supp. 2, pp. 167-169.*
Oder, R.R., High gradient magnetic separation theory and applications, 1976, IEEE Transactions on magnetics, vol. MAG-12, No. 5, pp. 428-435.*

(Continued)

*Primary Examiner* — Yate K Cutliff
(74) *Attorney, Agent, or Firm* — Timothy S. Westby; Porter Hedges, LLP

(57) ABSTRACT

A system for separating liquids from solids comprising an immobilization unit comprising an immobilization vessel containing a bed of magnetizable material and a magnet configured to produce a magnetic field within the immobilization vessel, wherein the immobilization vessel further comprises an immobilization vessel outlet and an immobilization vessel inlet for a fluid comprising liquid and metal-containing particles. A method for separating solid particles from liquid by introducing a fluid comprising liquid and a first concentration of solid particles into an immobilization unit comprising an immobilization vessel and at least one magnet configured to produce high density magnetic flux lines within the immobilization vessel and/or a high field gradient at or near the surface of the magnetizable material when powered, wherein the immobilization vessel contains therein a bed of magnetizable material; and removing from the immobilization unit a product having a second particle concentration less than the first particle concentration.

22 Claims, 3 Drawing Sheets

(56) References Cited

OTHER PUBLICATIONS

U.S. Appl. No. 60/971,093, filed Sep. 10, 2007 entitled "Magnetic Separation Combined With Dynamic Settling for Fischer-Tropsch Processes".

Magnetic Separation of Iron Catalysts from Fischer-Tropsch Wax, R. R. Oder, Proceedings of the Petroleum Chemistry Division, ACS Annual Meeting, CA (Mar. 28-Apr. 1, 2004).

Separation of Iron Catalysts from Fischer-Tropsch Wax, R. R. Oder et al., Twentieth Annual Pittsburgh Coal Conference: Coal, Energy and the Environment, Pittsburgh, PA (Sep. 15-19, 2003).

International Application No. PCT/US2009/060422 International Search Report dated May 28, 2010, 10 pages.

Australian Office Action dated Jun. 19, 2012 for counterpart Australian Application No. 2009303592; 3 pages.

Chinese Office Action dated Mar. 20, 2013 for corresponding Chinese Application No. 200980140706.5 (3 pgs.).

Eurasian Office Action dated Mar. 26, 2013 for corresponding Eurasian Application No. 201170386 (4 pgs.).

Canadian Office Action dated Sep. 26, 2012 for corresponding Canadian Application No. 2,739,036 (3 pgs.).

Chinese Office Action dated Oct. 25, 2013 for corresponding Chinese Application No. 200980140706.5 (10 pgs.).

* cited by examiner

INTEGRATED MULTI-STEP SOLID/LIQUID SEPARATION SYSTEM FOR FISCHER-TROPSCH PROCESSES

CROSS-REFERENCE TO RELATED APPLICATIONS

This application claims the benefit under 35 U.S.C. §119 (e) of U.S. Provisional Patent Application Ser. No. 61/104, 816 filed Oct. 13, 2008, which is hereby incorporated herein by reference in its entirety.

STATEMENT REGARDING FEDERALLY SPONSORED RESEARCH OR DEVELOPMENT

Not Applicable.

BACKGROUND OF THE INVENTION

1. Technical Field

The present invention relates generally to separating liquids from solid particles having magnetic properties. Specifically, the system and method may be used to separate liquid from solid catalyst particles and may be applied in multi-phase catalytic reactors where the catalyst comprises solids with magnetic properties. Such multiphase catalytic reactors may be Fischer-Tropsch (FT) reactors of a Fischer-Tropsch synthesis process.

2. Background of the Invention

Several methods for separating liquids and solids in a Fischer-Tropsch process/reactor system have been proposed. These methods include settling, filtration, and combinations thereof. Magnetic separation alone has also been proposed. Typically, primary separation and secondary separation are utilized, with primary separation removing the larger solids and secondary separation removing smaller solids. Both the primary separators and the secondary separators may be settlers. Primary settlers may be dynamic settlers. In certain applications, primary separators are cross-flow filtration units. Secondary separators are conventionally cross-flow filtration devices, or settlers.

Settling is a method utilized to separate solids and liquids, and may be applied in Fischer-Tropsch processes/reactor systems. Settlers may be of the vertical type or may be inclined settlers. See, for example, U.S. Pat. Nos. 6,068,760; 6,712, 982; and 7,078,439. Inclined settlers, also known as lamella type settlers, may permit higher liquid removal rates than the same size vertical settler. The design of such settlers is based on particle settling velocity which is highly dependent on particle diameter. Thus, once a settler is designed, settling of particles of a particular diameter or larger is obtained. If attrition, etc., reduces the size of the particles, these particles may exit the settler with the liquid, thus contaminating the liquid. In a Fischer-Tropsch process, when catalyst particles exit the reactor, the particles not only contaminate the liquid product but also decrease the catalyst inventory in the reactor. Both of these events are detrimental to the process economics.

Fischer-Tropsch catalysts, which are typically either iron-based or cobalt-based, are prone to attrition. Typical particles of fresh catalyst have a size in the range of 20-100 microns. Attrition may result in the formation of particles having a size of less than 20 microns; in certain applications, particle size may even reach sub-micron levels. These smaller particles tend to plug filter media and/or alter the characteristics of the cake on the filter media, thus compacting the filter, which may become substantially impermeable. Filtration across compact cakes mandates a higher pressure drop across the filtration media to obtain the same amount of liquid filtrate. This creates a vicious cycle of higher pressure drop leading to more compact cakes and/or media plugging which may ultimately render the system ineffective.

Cross flow filtration is one of the most widely used methods of separation. Cross flow filtration is described, for example, in U.S. Pat. Nos. 6,929,754 and 6,833,078. In some applications, a "mild" cross flow filtration method is utilized. By this method, a 'cake' of catalyst particles is formed on the surface of the filter media, and this cake acts as the primary barrier for the prevention of solids passing through the filter media and contaminating the liquid. Some disadvantages of this method, however, are that the filter medium is usually prone to plugging by small particles which may be present due to physical and/or chemical attrition during the use of the media. Filter media are design for a certain micron rating. For example, with a micron rating of 20 microns, particles larger than 20 microns will theoretically be retained on the surface of the media. Particles smaller than 20 microns may travel through the media and exit or may get stuck within the pores of the filter medium due to agglomeration, shape and/or other factors. Even though a backwash method may be used to attempt to unplug the medium, the medium may become ineffective with time on stream. Eventually, the filter elements must be removed from the system and replaced.

Smaller particles, say less than 20 microns, and mainly those less than 10 microns and perhaps less than 1 micron tend to render a "mild" cross flow filtration process ineffective for separation of liquids and solids in Fischer-Tropsch processes. These smaller particles also cause separation of the particles from the liquid by sedimentation alone very difficult. The settling equipment tends to become large and thus economically impractical.

Magnetic separation alone has previously been proposed to separate solids and liquids in Fischer-Tropsch processes/reactors systems. For example, see "Magnetic Separation of Iron Catalysts from Fischer-Tropsch Wax," R. R. Oder, Proceedings of the Petroleum Chemistry Division, ACS Annual Meeting, CA (Mar. 28-Apr. 1, 2004); and "Separation of Iron Catalysts from Fischer-Tropsch Wax," R. R. Oder et al., Twentieth Annual Pittsburgh Coal Conference: Coal, Energy and the Environment, Pittsburgh, Pa. (Sep. 15-19, 2003). This form of separation comprises passing a slurry containing the liquid and solids through a vessel the walls of which have been magnetized. If the solid particles have magnetic properties, the particles tend to accumulate on the walls of the vessel and fall to the bottom of the vessel, continuing to travel in the direction of the slurry. Thus, particle-reduced liquid may be withdrawn from the top of the vessel. However, this method tends to be more effective for smaller particles, for example, sub-micron-sized particles. In order for the method to be effective for a broad range of particle sizes, for example, for particles having sizes from sub-micron to 100 microns, the equipment may have to be rather large and the power needed for the magnetization much higher than the power required for the separation of particles within a smaller size range.

In a Fischer-Tropsch process, wax product streams from which particles have been removed by primary and optionally secondary separation, are sent for product upgrading, PU. Catalyst-containing streams separated in primary and/or secondary separation may be recycled to the Fischer-Tropsch reactor or disposed according to regulations. Product upgrading processes at the back end of Fischer-Tropsch plants typically comprise hydrogenation, hydrocracking and/or isomerization processes, whereby the Fischer-Tropsch liquids produced in the Fischer-Tropsch reactors are refined to obtain desirable products. These product upgrading processes are often stringent in the amount of solids that can be tolerated in the liquid feed to be treated, usually limiting the solids content of the liquid feed to less than 10 ppm by weight. Particle reduction to the desired specification in the Fischer-Tropsch liquid product may be challenging.

Accordingly, there is a need in industry for reliable and efficient systems and methods for separating catalyst particles having magnetic properties from liquids.

SUMMARY

Herein disclosed is a system for the separation of liquids from solids, the system comprising an immobilization unit comprising an immobilization vessel containing a bed of magnetizable material and a magnet configured to produce a magnetic field within the immobilization vessel, wherein the immobilization vessel further comprises an immobilization vessel outlet and an immobilization vessel inlet for a fluid comprising liquid and metal-containing particles. The magnet may be capable of producing high density magnetic flux lines within the immobilization vessel. The bed of magnetizable material may comprise a plurality of interwoven fibers. The magnetizable material may be configured as magnetizable steel wool.

In embodiments, the system further comprises a Fischer-Tropsch reactor, the Fischer-Tropsch reactor positioned upstream of the immobilization vessel, the Fischer-Tropsch reactor containing within it a metal-based Fischer-Tropsch catalyst, the Fischer-Tropsch reactor comprising an outlet for Fischer-Tropsch product comprising Fischer-Tropsch product wax and catalyst particles, the outlet in direct or indirect fluid communication with the magnetic field vessel. The catalyst may be cobalt-based Fischer-Tropsch catalyst, iron-based Fischer-Tropsch catalyst, or a combination thereof. In applications, the catalyst comprises iron carbide. The system may further comprise a primary separator positioned upstream of the immobilization vessel, an inlet of the primary separator in fluid communication with the Fischer-Tropsch outlet and an outlet of the primary separator in fluid communication with the immobilization vessel inlet. A surge drum may be positioned between the primary separator and the immobilization vessel. The primary separator may be a dynamic settler. The primary dynamic settler separator may comprise a magnetic separation section.

In embodiments of the system, the system comprises at least two immobilization units aligned in series. The system may comprise at least two immobilization units aligned in parallel. The system may comprise at least three immobilization units, with at least two of the immobilization units aligned in series.

Also disclosed herein is a method for separating solid particles from liquid by: introducing a fluid comprising liquid and a first concentration of solid particles into an immobilization unit comprising an immobilization vessel and at least one magnet configured to produce high density magnetic flux lines within the immobilization vessel and/or a high field gradient at or near the surface of the magnetizable material when powered by a power source, wherein the immobilization vessel contains therein a bed of magnetizable material; and removing from the immobilization unit an immobilization unit product having a second particle concentration, wherein the second particle concentration is less than the first particle concentration. The magnetic material may be a high permeability magnetic matrix. In applications, the magnetizable material is in the shape of steel wool. The magnetizable material may comprise a plurality of interwoven fibers. In embodiments, the second particle concentration is less than 100 ppm-wt, preferably less than 10 ppm-wt and more preferably less than 1 ppm-wt. The method may comprise introducing the fluid comprising liquid and a first concentration of solid particles into a plurality of immobilization units configured in series, in parallel, or a combination thereof. The method may be operable continuously, and the product may comprise a solids content of less than 10 ppm-wt.

The bed of magnetizable material within the immobilization vessel may be backwashed to remove solids from the bed. Backwashing may comprise shutting off the power source to the at least one magnet and introducing a backwash fluid to the bed. The backwash fluid may be introduced to the immobilization bed in the same direction or in the reverse direction to the direction from that in which the fluid comprising liquid and a first concentration of solid particles was introduced into the immobilization vessel. The backwash fluid may be any liquid appropriate for the temperature and pressure operating conditions of the immobilization vessel. In applications, the solid particles are catalytic. Such catalytic particles may be cobalt-based Fischer-Tropsch catalyst, iron-based Fischer-Tropsch catalyst, or a combination thereof. In specific embodiments, the catalytic particles comprise iron carbide.

The disclosed method may further comprising introducing a synthesis gas-containing stream into a Fischer-Tropsch reactor, wherein the Fischer-Tropsch reactor comprises solid particles of Fischer-Tropsch catalyst and is operable for the production of Fischer-Tropsch liquid hydrocarbon product, and removing from the Fischer-Tropsch reactor a Fischer-Tropsch product slurry comprising Fischer-Tropsch liquids and a concentration of catalyst particles. The Fischer-Tropsch product slurry may be introduced into a primary separator positioned upstream of the immobilization unit, a primary separator product having a reduced solids content relative to that of the Fischer-Tropsch product slurry may be removed from the primary separator, and the primary separator product may be introduced into the immobilization unit. The primary separator may be a dynamic separator. The immobilization unit product may be upgraded via at least one selected from hydrotreating processes, hydrocracking processes, and isomerization processes. Upgrading may produce a clean fuel selected from jet fuel, diesel, naphtha or a combination thereof. The immobilization unit product may be suitable as fuel. The immobilization unit product may be introduced into at least one separation process whereby a chemical product is obtained. Such a chemical product may be selected from the group consisting of olefins, alcohols, other oxygen containing components, and combinations thereof.

These and other embodiments and potential advantages of the disclosed system and method will become apparent upon reading the detailed description and viewing the accompanying drawings. While specific examples may be presented in the following description, other embodiments are also envisioned. The embodiments described herein are exemplary only, and are not intended to be limiting.

BRIEF DESCRIPTION OF THE DRAWINGS

For a more detailed description of the preferred embodiment of the present invention, reference will now be made to the accompanying drawings, wherein.

NOTATION AND NOMENCLATURE

As used herein, the phrase "immobilization unit" is used to refer to a separation unit comprising a bed of magnetizable material which may be magnetized by magnets in contact with a vessel containing the bed.

The phrase "immobilization bed" is used to refer to a bed of magnetizable material within an immobilization unit.

As used herein, the term "syngas" and the phrase "synthesis gas" are used to refer to a gaseous stream comprising hydrogen and carbon monoxide. The "syngas" or "synthesis gas" stream may further comprise other components, for example, without limitation, the "syngas" or "synthesis gas" stream may comprise carbon dioxide, methane, etc.

DETAILED DESCRIPTION

Overview. The disclosed invention provides a system and method for separating liquids from solids having magnetic properties. The system and method feature a unique combination of dynamic settling in a first step and a bed immobilization method that includes a magnetic filtration system in a second step. The system and method may provide a liquid or filtrate substantially free of solid particles. Although this description is presented with reference to the separation of Fischer-Tropsch catalyst from liquid hydrocarbons, it is to be understood that the invention will prove valuable for numerous separation processes, in particular for instances where a magnetizable catalyst is present in a liquid slurry. Description of the Fischer-Tropsch system and process is not meant to limit the invention to Fischer-Tropsch processes and systems, and one of skill in the art will realize the broad applicability of the disclosed invention.

Figure 1:
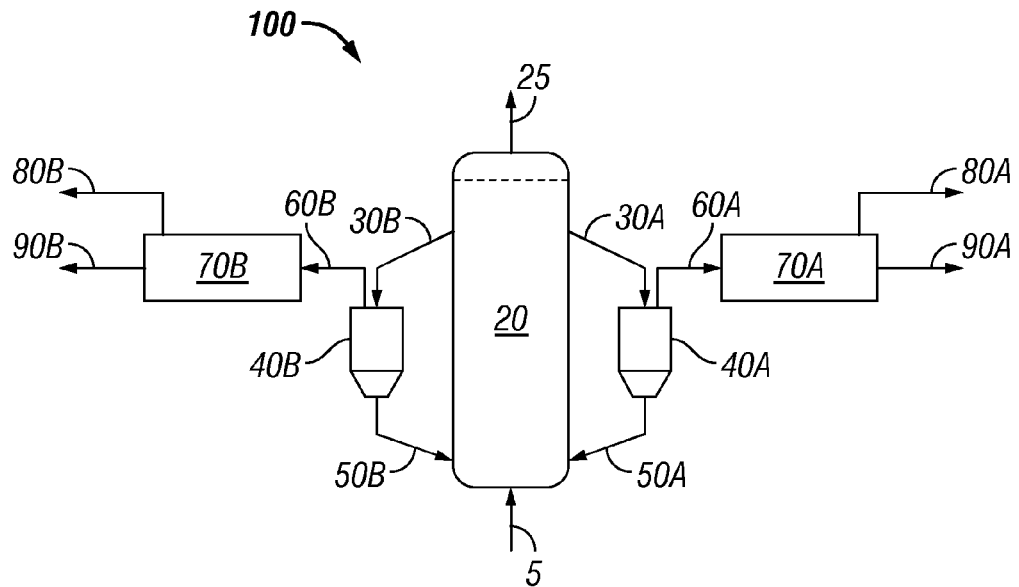
FIG. 1 is a schematic of a system provided in the prior art for removing catalyst from wax produced via Fischer-Tropsch conversion of synthesis gas.

Comparative System. FIG. 1 is a schematic of a prior art system 100 for removing catalyst from wax following Fischer-Tropsch (FT) reaction. Prior art system 100 comprises Fischer-Tropsch reactor 20, primary separators 40A and 40B and secondary separators 70A and 70B. In FIG. 1, feed stream 5 comprising synthesis gas is fed into Fischer-Tropsch reactor 20 comprising Fischer-Tropsch catalyst. Tailgas 25 exits reactor 20 and liquid wax product streams 30A and 30B are removed from FT reactor 20. It is noted that 2 separation loops are shown in FIG. 1, but any number of separation loops is used, including a single separation loop. Liquid product streams 30A and 30B, containing catalyst slurry are treated to separate the wax product from the catalyst. Primary separators 40A and 40B are used as a primary separation method, producing catalyst-rich streams 50A and 50B and liquid-rich (e.g., hydrocarbon or wax-rich) streams 60A and 60B. Conventionally, primary separators 40A and 40B comprise some sort of filtration such as "cake" filtration or are settlers (e.g., dynamic settlers). In applications, primary separators are cross-flow filtration units as described hereinabove.

At least a portion of the separated catalyst in lines 50A and 50B may be recycled to FT reactor 20 with or without intervening treatment. In some applications, at least a portion of slurry in lines 50A and 50B is not recycled. The separated wax in lines 60A and 60B may be further treated by introduction into secondary separators 70A and 70B. Secondary separators systems 70A and 70B are conventionally cross-flow, e.g., "mild" cross-flow filtration, or "cake" filtration devices or settlers.

Following primary and optionally secondary separation, wax product streams 80A and 80B are typically sent to product upgrading, PU, while catalyst-containing streams 90A and 90B are typically disposed according to regulations. Backend processes in FT (Fischer-Tropsch) product upgrading often comprise hydrogenation, hydrocracking and/or isomerization processes that refine the liquids produced in the Fischer-Tropsch reactors to final usable products. These processes may be stringent in the amount of solids that can be tolerated in the liquid feed to be treated. Typically, the particle content of the liquid feed to the product upgrading systems is limited to less than 10 ppm by weight. This limitation makes achievement of the desired specification in the Fischer-Tropsch liquid product challenging. Typically, therefore, multiple separation steps and/or large separation units are required.

Figure 2:
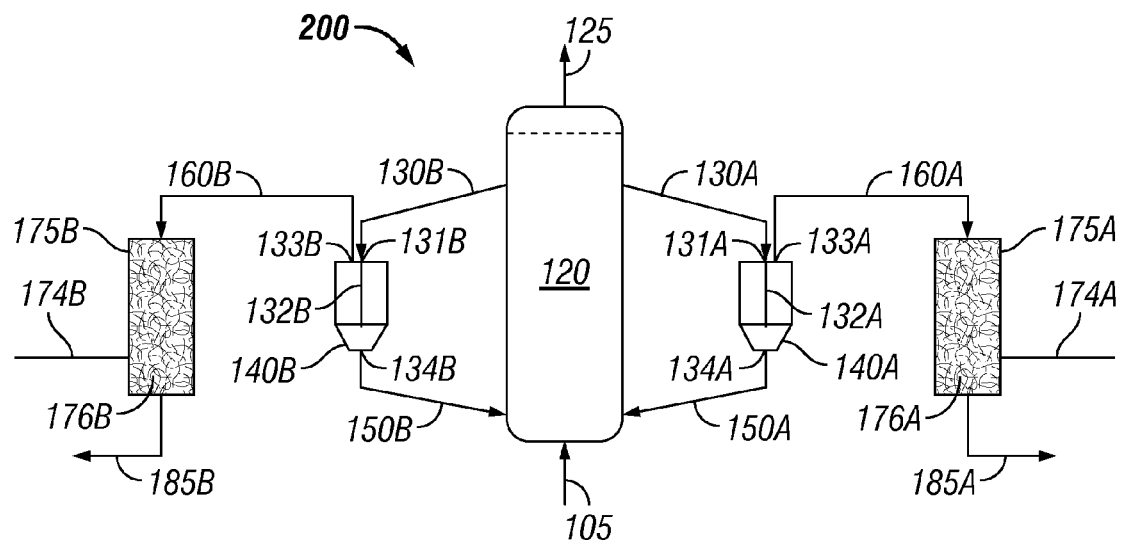
FIG. 2 is a schematic of a system for removing catalyst from wax subsequent Fischer-Tropsch conversion of synthesis gas into hydrocarbons according to an embodiment of the invention.

System for Integrated Multi-Step Solid/Liquid Separation. Description of the invention will now be made with reference to FIG. 2, which is a schematic of an inventive system for removing catalyst from hydrocarbon wax product produced via Fischer-Tropsch conversion of synthesis gas. It is again noted that 2 separation loops are shown in FIG. 2, as in the prior art system 100 of FIG. 1, however, any number of separation loops is envisioned, including a single separation loop.

Integrated System 200 comprises FT reactor 120, primary separators 140A and 140B, and secondary separators 175A and 175B with power sources 174A and 174B, respectively. Each of these components will be described in more detail hereinbelow. Other units may be positioned between reactor 120 and the primary separators 140A and 140B, between primary separators 140A and 140B and secondary separators (or immobilization units) 175A and 175B as desired. For example, in instances, one or more surge drums (and/or pumps) may be positioned between primary separator 140A and secondary separator 175A, between primary separator 140B and secondary separator 175B, or both.

Fischer-Tropsch Reactors. System 200 comprises a Fischer-Tropsch reactor. The Fischer-Tropsch reactor may be any suitable reactor known in the art to be suitable for the conversion of synthesis gas into higher ($C^{2+}$) hydrocarbons. In embodiments, the Fischer-Tropsch reactors are slurry reactors. As the Fischer-Tropsch reaction is highly exothermic, the Fischer-Tropsch reactor(s) may comprise internal or external heat exchangers to control the temperature of the reactor contents.

Fischer-Tropsch Catalyst. FT reactor 120 comprises Fischer-Tropsch catalyst effective for catalyzing the conversion of carbon monoxide and hydrogen into $C^{2+}$ hydrocarbons. The disclosed system and method are suitable when a catalyst has magnetic properties. In embodiments, the Fischer-Tropsch catalyst is a metal-based catalyst. In preferred embodiments, the Fischer-Tropsch catalyst comprises a cobalt or iron-based catalyst. Most preferably, the Fischer-Tropsch catalyst is an iron carbide catalyst. In specific applications, the catalyst comprises cobalt. In other applications, the catalyst comprises iron.

A suitable catalyst is described in U.S. patent application Ser. No. 12/198,459, which is hereby incorporated herein to the extent that it provides details or explanations supplemental to those disclosed herein. Depending on the preselected alpha, i.e., the polymerization probability desired, a precipitated iron catalyst may have a weight ratio of potassium (e.g., as carbonate) to iron in the range of from about 0.005 and about 0.015, more preferably in the range of from 0.0075 to 0.0125, and most preferably about 0.010. Larger amounts of alkali metal promoter (e.g., potassium) may cause the product distribution to shift toward the longer-chain molecules, while small amounts of alkali metal may result in a predominantly gaseous hydrocarbon product.

The weight ratio of copper to iron in the iron Fischer-Tropsch catalyst may be in the range of from about 0.005 and 0.050, more preferably in the range of from about 0.0075 and 0.0125, and most preferably about 0.010. Copper may serve as an induction promoter. In preferred embodiments, the weight ratio of Cu:Fe is about 1:100.

The catalyst may be an iron Fischer-Tropsch catalyst comprising structural promoter. The structural promoter may significantly reduce the breakdown of the catalyst in a SBCR (slurry bubble column reactor). The structural promoter may comprise silica, and may enhance the structural integrity during activation and operation of the catalyst. In embodiments, the catalyst comprises a mass ratio of $SiO_2$:Fe of less than about 1:100 when the structural promoter comprises silica and less than about 8:100 when the structural promoter comprises silica sol.

In embodiments, the at least one structural promoter is selected from oxides of metals and metalloids and combinations thereof. The structural promoter may be referred to as a binder, a support material, or a structural support.

Depending on the level of structural promoter comprising silicate and the preselected alpha, i.e. the polymerization probability desired, the weight ratio of K:Fe may be from about 0.5:100 to about 6.5:100. More preferably, the weight ratio of K:Fe is from about 0.5:100 to about 2:100. In some embodiments, the weight ratio of K:Fe is about 1:100.

In some embodiments wherein the structural promoter comprises silica sol, the weight ratio of iron to potassium is in the range of from about 100:1 to about 100:5. In some embodiments, the weight ratio of iron to potassium is in the range of from about 100:2 to about 100:6. In more preferred embodiments, the weight ratio of iron to potassium is in the range of from about 100:3 to about 100:5. In some embodiments, the weight ratio of iron to potassium is in the range of from about 100:4 to about 100:5. In some preferred embodiments, the weight ratio of iron to potassium is in the range of from about 100:2 to about 100:4. In some specific embodiments, the weight ratio of iron to potassium about 100:3. In other certain embodiments, the weight ratio of iron to potassium is about 100:5.

In embodiments wherein the structural promoter comprises silica sol, the weight ratio of iron to copper may be in the range of from about 100:1 to about 100:7. In some embodiments, the weight ratio of iron to copper is in the range of from about 100:1 to about 100:5. More preferably, the weight ratio of iron to copper is in the range of from about 100:2 to about 100:6. Still more preferably, the weight ratio of iron to copper is in the range of from about 100:3 to about 100:5. In some preferred embodiments, the weight ratio of iron to copper is in the range of from about 100:2 to about 100:4. In other specific embodiments, the weight ratio of iron to copper is about 100:5. In yet other specific embodiments, the weight ratio of iron to copper is about 100:3.

Broadly, in embodiments, wherein the structural promoter is silica sol, the iron to $SiO_2$ weight ratio may be in the range of from about 100:1 to about 100:8; alternatively, in the range of from 100:1 to 100:7. More preferably, in some embodiments, wherein the structural promoter is silica, the iron to $SiO_2$ weight ratio may be in the range of from about 100:2 to about 100:6. Still more preferably, the weight ratio of iron to silica is in the range of from about 100:3 to about 100:5. In some preferred embodiments, wherein the structural promoter is silica, the iron to $SiO_2$ weight ratio is about 100:5. In embodiments, wherein the structural promoter is silica, the iron to $SiO_2$ weight ratio may be in the range of from about 100:3 to about 100:7; alternatively, in the range of from about 100:4 to about 100:6. In some preferred embodiments, the Fe:Cu:K:$SiO_2$ mass ratio is about 100:4:3:5.

During Fischer-Tropsch conversion, the percent by weight of the disclosed iron catalyst in the slurry in Fischer-Tropsch reactor 120 (for example, in a slurry bubble column reactor, or SBCR) may be in the range of from 5 to 15 percent by weight of iron in the slurry, in the range of from 7.5 and 12.5 percent by weight, or about 10 percent by weight of the slurry.

Primary Separators. System 200 comprises at least one primary separator. In the embodiment of FIG. 2, system 200 comprises two primary separators, primary separators 140A and 140B. The primary separators each comprise an inlet fluidly connected to an outlet of FT reactor 120. Primary separators 140A and 140B each also comprise an outlet fluidly connected to a line for a catalyst-rich product (lines 150A and 150B, respectively), and an outlet fluidly connected to a line for catalyst-lean product (lines 160A and 160B, respectively).

In embodiments, primary separators 140A and 140B are settlers. In preferred embodiments, primary separators 140A and 140B are dynamic settlers. In specific embodiments, primary settlers 140A and 140B are dynamic settlers which combine magnetic separation (magnetic/dynamic settlers) as described in U.S. provisional patent application 60/971,093 to Mohedas. Such a magnetic dynamic settling vessel comprises at least one magnetic field within the vessel, at least one fluid inlet 131A/131B for introduction of the fluid stream having a starting solids content, at least one exit 133A/133B for a fluid stream comprising a solids content not greater than the inlet solids content, at least one exit 134A/134B for a fluid stream comprising a solids content not less than the inlet solids content, and a vertical feed conduit 132A/132B extending at least 70% of the distance from the at least one fluid inlet to the at least one exit for a fluid stream comprising a solids content not less than the inlet solids content. In embodiments, the at least one magnetic field is provided by at least one magnetic component. The at least one magnetized component may be selected from the group consisting of at least a portion of the external walls of the magnetic dynamic settling vessel, at least a portion of the internal walls of the settling vessel, magnetic baffles, magnetic fins, magnetic rods, magnetic plates, another magnetized internal component, and combinations thereof. In some embodiments, the at least one magnetized component comprises at least a portion of the walls of the magnetic dynamic settling vessel. In embodiments, the at least one magnetized component is an internal component.

In some embodiments, a magnetic dynamic settling vessel of the primary separation comprises an upper portion comprising vertical external walls and a narrower lower portion comprising inclined external walls. In embodiments, at least a portion of the vertical walls, at least a portion of the inclined walls, or at least a portion of both is magnetized. The at least a portion of the vertical walls, at least a portion of the inclined walls, or at least a portion of both may be magnetized by at least one externally positioned magnet.

In embodiments the at least one magnetic field is created within the vessel in the slurry body (slurry volume) without necessarily having a magnetized component within the magnetic dynamic settling vessel. The at least one magnetic field may be throughout the vessel. In preferred embodiments, the at least one magnetic field is within the bottom section of the magnetic dynamic settling vessel.

In embodiments, primary separation further comprises a second dynamic settler, the second dynamic settler comprising at least one secondary dynamic settler inlet in fluid connection with the at least one exit for a fluid stream comprising a solids content not less than the inlet solids content; at least one secondary dynamic settler concentrated solids exit; and at least one secondary dynamic settler liquid product exit.

The magnetic dynamic settling vessel of the primary separation may be capable of producing an exit fluid stream comprising a solids content not greater than 5000 ppm by weight. In some embodiments, the magnetic dynamic settling vessel is capable of producing an exit fluid stream comprising a solids content not greater than 2500 ppm by weight. In some embodiments of the system, the magnetic dynamic settling vessel is capable of producing an exit fluid stream comprising a solids content not greater than 1000 ppm by weight. The magnetic dynamic settling vessel may be operable at a liquid linear upward velocity greater than least 15 cm/h. In embodiments, the magnetic dynamic settling vessel is operable at a liquid linear upward velocity greater than 45 cm/h. Alternatively, the magnetic dynamic settling vessel may be operable at a liquid linear upward velocity greater than 90 cm/h.

Secondary Separators. System 200 comprises at least one secondary separator. In the embodiment of FIG. 2, system 200 comprises two secondary separators 175A and 175B. Secondary separators 175A and 175B each comprise inlets fluidly connected with the lines for catalyst-lean product from the primary separators (lines 160A and 160B, respectively), and outlets fluidly connected to lines for substantially catalyst-free hydrocarbon product (lines 185A and 185B, respectively).

Figure 3A:
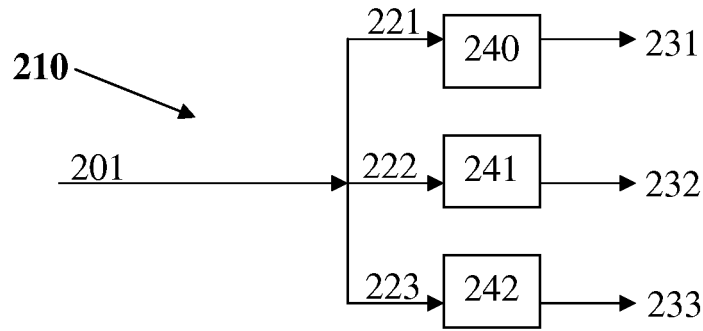
FIG. 3a is a schematic of a first configuration of immobilization units for secondary separation according to an embodiment of the invention.

In some embodiments of system 200, a plurality of secondary separators is configured in series and/or in parallel. For example, as shown in FIG. 3a, which is a schematic of a first configuration 210 of 'immobilization units' (i.e. secondary separators utilizing magnetic field) for secondary separation, two or more secondary separators may be aligned in parallel. In the embodiment of FIG. 3a, three secondary separators, 240, 241, and 242 are aligned in parallel. Catalyst/wax slurry) is introduced via line 201 and lines 221, 222, and 223 into secondary separators 240, 241, and 242, respectively. Catalyst-lean liquid exits secondary separators 240, 241, and 242 via lines 231, 232, and 233, respectively.

Figure 3B:
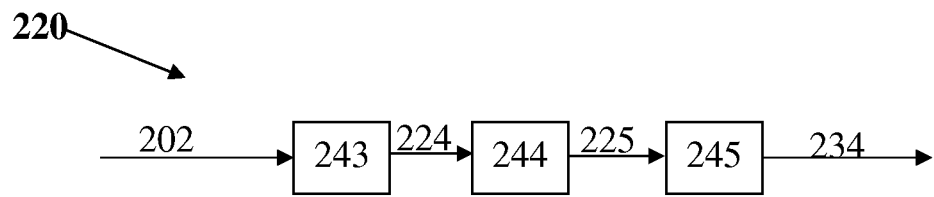
FIG. 3b is a schematic of a second configuration of immobilization units for secondary separation according to another embodiment of the invention.

As another example, as shown in FIG. 3b, which is a schematic of a second configuration 220 of immobilization units for secondary separation, two or more secondary separators may be aligned in series. For example, in the embodiment of FIG. 3b, secondary separators 243, 244, and 245 are aligned in series. Catalyst slurry is introduced via line 202 into the first secondary separator, 243, of a series of secondary units. Within first secondary separator 243, catalyst material is separated from catalyst-lean material, which is subsequently introduced into the second secondary separator, 244 via line 224, and so on. For example, from second secondary separator 244, catalyst-reduced material in line 225 may be introduced into the third secondary separator, 245, of the series. Substantially catalyst-free liquid may exit the train of separators, for example, via line 234 of configuration 220 of FIG. 3b.

Figure 3C:
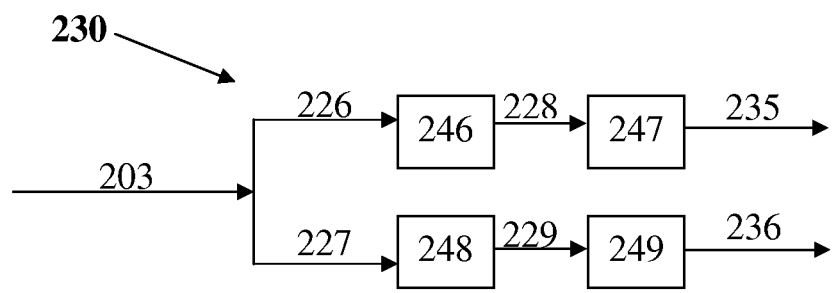
FIG. 3c is a schematic of a third configuration of immobilization units for secondary separation according to another embodiment of the invention.

As yet another example, as shown in FIG. 3c, which is a schematic of a third configuration 230 of immobilization units for secondary separation, three or more secondary separators may be aligned in a combination of serial and parallel flow. For example, in the embodiment of FIG. 3c, slurry in line 203 is introduced via lines 226 and 227 into parallel trains of secondary separators in series. The first train comprises secondary separators 246 and 247 aligned in series connected via line 228, with material introduced into separator 246 via line 226 and exiting as a catalyst-reduced liquid via line 235. Catalyst-reduced material in line 228 is introduced into the next secondary separator in the first train, secondary separator 247. In a parallel manner, slurry in line 227 is introduced to the first secondary separator of the second train of serially aligned separators, secondary separator 248. Catalyst-reduced material exiting secondary separator 248 via line 229 is introduced into the second secondary separator of the second train, secondary separator 249. Catalyst reduced material exits the second train of configuration 230 via line 236.

In this manner any number and alignment of secondary separators may be utilized. Secondary separators 175A and 175B may be reactors similar to those described in U.S. Patent Publication 20070280864 to Kenneth Cross which was filed Dec. 7, 2007. In this publication, a High-Efficiency Nano-Catalyst Immobilization reactor or HENCI is discussed. The HENCI reactor comprises immobilized catalyst which may be used for the catalytic breakdown of halogenated hydrocarbons. By this disclosure, vessels containing a similar high permeability material and magnetized as disclosed in U.S. Patent Publication 20070280864 are used to extract magnetic catalyst from a slurry comprising the catalyst, rather than being loaded with catalyst prior to reaction and reacting the reactants within the immobilization vessel. By this disclosure, therefore, magnetic field immobilization units are adapted for separation of solids and liquids, rather than for promoting reaction thereof.

Figure 4:
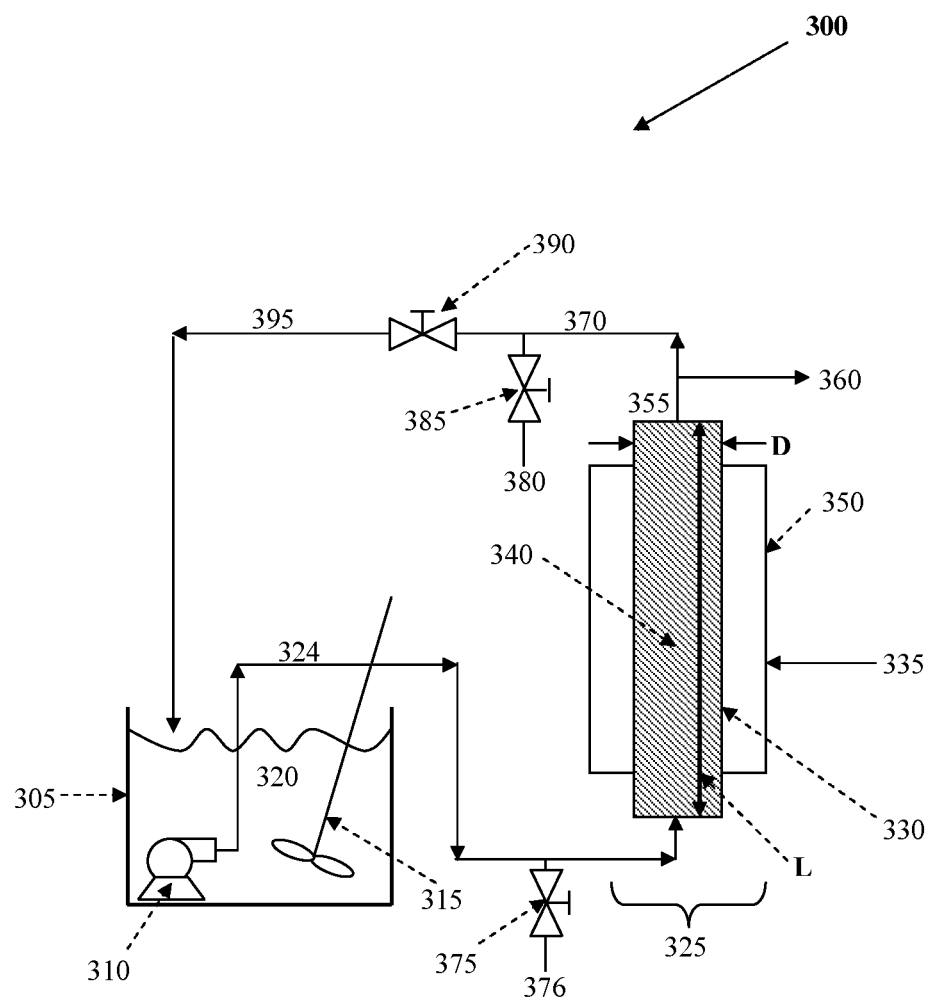
FIG. 4 is a schematic of the bench scale separation system used in the experiments of Example 1.

As depicted most clearly in FIG. 4, secondary separator 325 may comprise magnets 350 surrounding at least a portion of the outer walls of immobilization vessel 330. Magnets (not shown in FIG. 2) may surround at least a portion of the outer body of secondary separators 175A and 175B. The secondary separator comprises a bed of packed material, 340, which is magnetizable. In the embodiment of FIG. 2, secondary separators 175A and 175B are packed with a magnetizable material, 176A and 176B, respectively. The magnetizable material may be in the form of steel wool, thin metallic filaments or other configuration suitable for packing. The immobilization bed within the immobilization vessel of the secondary separator may comprise a high permeability magnetic matrix. The matrix may comprise interwoven metallic fibers.

Secondary separator 325 (and secondary separators 175A and 175B of FIG. 2) may be connected to a source of power (not shown, similar to 174A and 174B, respectively in FIG. 2) for providing the desired magnetic field(s) within. Powering the magnet or magnets may result in the formation of high density magnetic flux lines within the immobilization vessel and/or a high field gradient at or near the surface of the packing material. The cost of this power may be comparable to the cost of power needed to pump very high flow rates through a cross flow filtration unit typical of the prior art, that operates in high recirculation mode, potentially making the herein disclosed system and method desirable from an economic standpoint.

The secondary separators in the catalyst/wax separation system utilize a unique method to immobilize small magnetic particles, with sizes ranging from nanometer-size to hundreds of microns in size. The small magnetic particles are immobilized on a bed filled with material upon which a magnetic field has been applied (e.g., steel wool or the like). The beds may comprise high permeability magnetic matrix material in the form of steel wool or woven type filling material for reactor beds having various geometries of packing structure. The packing structure may resemble packing structures used in packed distillation towers.

In embodiments, the secondary separator is capable of reducing the solids content of an inlet fluid comprising liquid and solid particles to a concentration of less than about 100 ppm-wt, more preferably less than 10 ppm-wt, and most preferably to less than 1 ppm-wt.

Product Upgrading Units. System 200 may further comprise one or more product upgrading units, PU units (not shown in FIG. 2). Product upgrading units may be any suitable units known in the art for upgrading the Fischer-Tropsch hydrocarbons produced in the Fischer-Tropsch reactors. In embodiments, a PU unit is selected from hydrotreating units, hydrocracking units, fractionators, separators, and combinations thereof.

Surge Drums. In applications, one or more surge drums may be positioned between primary separator 140A and secondary separator 175A, between primary separator 140B and secondary separator 175B, or both. The surge drums may serve to hold material exiting the primary separators prior to introduction thereof into secondary separators. For example, this may be used when a secondary separator is taken offline for service, replacement, or repair. Such surge drums may also be positioned between reactor 120 and primary separators 140A and/or 140B, if desired. One or more pumps may be positioned between surge drums and immobilization units 175A and 175B.

Process for Separation of Catalyst from Liquids. Description of a process for separating solid particles from liquids will now be made with reference to FIG. 2. In this process, synthesis gas in line 105 is introduced into Fischer-Tropsch reactor 120. Reactor 120 comprises Fischer-Tropsch catalyst as described hereinabove. Reactor tailgas exits Fischer-Tropsch reactor 120 as tailgas stream 125. This tailgas may comprise unconverted carbon monoxide and hydrogen (i.e. synthesis gas), and other product gases or gases introduced with the synthesis gas. A portion of the synthesis gas in tailgas 125 may be recycled to FT reactor 120 for further conversion to hydrocarbons.

Product comprising catalyst slurry exits reactor 120 via lines 130A and 130B and is introduced into primary separators 140A and 140B, respectively. Primary separators 140A and 140B serve to remove the larger particles from the reactor effluent in lines 130A and 130B. In embodiments, (during normal operation, for example) the separated fluid exiting the primary separator in lines 160A and 160B comprises a solids content of less than 0.5% by weight (5,000 ppm); less than 0.25% by weight (2,500 ppm), less than 0.1% by weight (1,000 ppm), less than 0.05% by weight (500 ppm), or less than 0.01% by weight (100 ppm). In embodiments, the separated fluid exiting the primary separators via lines 160A and 160B (during start-up/activation, for example, which conditions are rough on the catalyst) comprises less than 5% by weight (50,000 ppm), less than 3% by weight (30,000 ppm), less than 2% by weight (20,000 ppm), less than 1% by weight (10,000 ppm) or less than about 0.5% by weight (5,000 ppm).

Catalyst separated from the liquid product by primary separators 140A and 140B and exiting the primary separators via lines 150A and 150B may, in certain applications, be recycled to FT reactor 120. Separated catalyst in lines 150A and 150B may or may not undergo intervening treatment prior to recycle to FT reactor 120.

Separated wax streams in lines 160A and 160B, which contain less catalyst than the product stream exiting reactor 120 via lines 130A and 130B, are introduced into secondary separators 175A and 175B. In embodiments, the fluid introduced into the secondary separators 175A and 175B comprises less than about 2% solids by weight, less than 1% solids by weight, or less than about 0.5% solids by weight. When separated wax streams in lines 160A and 160B comprising wax and solid particles are passed through the magnetic fields within immobilization beds 176A and 176B of secondary separators 175A and 175B, respectively, the solid particles with magnetic properties are attracted to the magnetized packing material (e.g., wires of wool) and deposit throughout the bed, becoming immobilized. In embodiments, the magnetic particles are distributed substantially uniformly through the bed of magnetized material.

With proper residence time, the wax streams exiting secondary separators 175A and 175B via lines 185A and 185B may be substantially particle-free. In embodiments, the solids content of an inlet fluid comprising liquid and solid particles is reduced to a concentration of less than about 100 ppm-wt, more preferably less than 10 ppm-wt, and most preferably to less than 1 ppm-wt via secondary separation.

In this manner, Fischer-Tropsch catalysts based on cobalt and/or iron and other catalysts having strong enough magnetic properties to be attracted by the magnetic fields and/or the magnetic field gradients created within the beds of secondary separators 175A and 175B, may be separated from liquid product produced in reactor 120 (e.g., an FT reactor).

Secondary Separator Magnetic Material Regeneration. The secondary separators may be cleaned via cessation of the magnetic field and backwash with an appropriate fluid. This regeneration of the magnetized material in the secondary separators may permit reduced operating costs. When it is desirable to clean a secondary separator, that separator may be taken offline, and the balance of the separators left online. This feature can be used in an industrial setting to continually process material by having several secondary separators in parallel (and/or in series), as depicted in FIGS. 3a-3c, for example, with some units in separation mode and some in backwash mode. The backwash fluid may be a portion of the fluid being separated. Desirably, however, the backwash fluid may be another available fluid in the plant with a lower value since the backwashed liquid/catalyst mixture will either be sold for a relatively low price, sent to a tertiary separation system, or disposed.

Features/Advantages. With the unique two step separation system and method of use presented herein, a system to separate liquids from solids, in particular, the wax from an Fe and/or Co-based Fischer-Tropsch catalyst in FT processes, may become more effective and/or reliable than traditional systems and may permit the use of smaller equipment to achieve solids content specifications on the liquids. For example, the system and method may be used to reduce the solids content in Fischer-Tropsch reactor product comprising liquid hydrocarbons (wax), yielding solids-reduced (and perhaps substantially solids-free) product in line 185A and 185B which may subsequently be introduced into a product upgrading system.

The disclosed system and method may permit reduced-size secondary separation units with a concomitant reduction in capital costs. The potential for reduced operating costs also exists due to the fact that the packing material of the separation units (steel wool, etc.) may be reused following cleaning by removing the magnetic field(s) and backwashing with appropriate liquid.

EXAMPLE

Bench scale tests were performed using cold flow and simulating Fischer-Tropsch streams 160 exiting a primary separation unit downstream of a Fischer-Tropsch reactor. Several bench scale tests were conducted using a secondary separation unit as described herein (i.e., a particle immobilization unit) to separate a liquid from nano/micro catalyst particles containing iron. FIG. 4 is a schematic of the bench scale separation system 300 used in this experiment.

A proxy liquid operating at room temperature was used to mimic the physical properties (density, viscosity, etc.) of Fisher-Tropsch wax at typical conditions at the exit of a Fischer-Tropsch reactor and downstream of a primary separation unit. The proxy liquid consisted of a mixture of a saturated poly-alpha olefin oil (branded as DURASYN® 164) and n-decane. The catalyst particles comprised Fe and had a mean particle size of 12 microns and a particle size distribution encompassing particles having sizes in the range of from sub-micron to 100+ microns. Catalyst particles and proxy liquid were mixed in slurry reservoir 305. Mixing was promoted via agitator 315. Slurry 320 in slurry reservoir 305 was pumped via slurry pump 310 and line 324 into secondary separator 325.

Secondary separator (or particle immobilization unit) 325 comprised an immobilization vessel 330. Immobilization vessel 330 was a cylindrical vessel having a diameter, D, of 4 inches and a length, L, of about 6 inches. Vessel 330 was filled with a metallic matrix (separation media) 340 comprising stainless steel 400 series wool made of wires with a diameter of around 45 microns. The amount of metallic wool used in this test was a piece of approximately 4 inch diameter by 6 ft long before compacting it inside the immobilization vessel 330. A magnet unit 350 surrounding the immobilization vessel 330 provided an open core magnetic field inside vessel 330 of about 500 gauss (without the metallic matrix). This translates to a relatively high field gradient near the surface of the wool. The liquid-solid mixture (slurry) contained 0.5% by weight of solid. Slurry was fed to the secondary separator 325 at approximately 0.25 to 0.5 gpm. After a few minutes recirculating the mixture with the magnetic field applied to the vessel 330, samples of the fluid stream at the outlet of the immobilization vessel were taken via valve 385 and line 380. Analysis of these samples showed that the solid content of the fluid was reduced from the original 0.5% wt to less than 1 ppm-wt.

When the fluid at the outlet became essentially clear, the power 335 to the magnet 350 of the secondary separator 325 was discontinued (stopping the magnetic field), pumping was stopped, and valve 390 closed. Valve 390 is connected to slurry reservoir 305 via line 395. A reverse flow was applied via valve 385 and line 380 to backwash the solid content from the metallic matrix 340. Backwash liquid comprising dislodged particles may be removed from system 300 via valve 375 and line 376. Backwashing proved to be very effective, and, after backwash, the metallic wool was substantially solids-free.

It was discovered that, with the appropriate flow rate and retention times within secondary separator 325, the particle concentration of the liquid in line 360 could be reduced to less than about 10 ppm, which may be required in subsequent product upgrading steps. The proper retention time can, in applications, be achieved by recirculation of the wax-catalyst mixture rather than by a once-through operation.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim 1s intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim 1s incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for separating solid particles from liquid, the method comprising:

introducing a fluid comprising liquid and a first solids content into a magnetic dynamic settler, and removing therefrom a settler product, wherein the settler product comprises a solids content that is less than the first solids content, wherein said magnetic dynamic settler comprises at least one fluid inlet for introduction of the fluid stream having the first solids content, at least one exit for said settler product, at least one exit for a fluid stream comprising a solids content not less than the first solids content, and a vertical feed conduit extending at least 70% of the distance from the at least one fluid inlet to the at least one exit for the fluid stream comprising the solids content not less than the first solids content;

introducing said settler product into an immobilization unit comprising an immobilization vessel and at least one magnet, wherein the immobilization vessel contains therein a bed of magnetizable material and wherein the at least one magnet is configured to produce high density magnetic flux lines within the immobilization vessel and/or a high field gradient at or near the surface of the magnetizable material when powered by a power source; and removing from the immobilization unit an immobilization unit product, wherein the immobilization unit product comprises a solids content that is less than that of the settler product, and wherein the immobilization unit product comprises a solids content of less than 100 ppm-wt.

2. The method of claim 1 wherein the magnetic material is a high permeability magnetic matrix.

3. The method of claim 2 wherein the magnetizable material is in the shape of steel wool.

4. The method of claim 1 wherein the magnetizable material comprises a plurality of interwoven fibers.

5. The method of claim 1 wherein the immobilization unit product comprises a solids content of less than 10 ppm-wt.

6. The method of claim 5 comprising introducing the settler product into a plurality of immobilization units configured in parallel.

7. The method of claim 1 wherein the settler product comprises a solids content of less than 1000 ppm-wt, and the immobilization unit product comprises a solids content of less than 10 ppm-wt.

8. The method of claim 1 further comprising backwashing the bed of magnetizable material within the immobilization vessel to remove solids from the bed by shutting off the power source to the at least one magnet and introducing a backwash fluid to the bed.

9. The method of claim 8 wherein the backwash fluid is introduced to the immobilization vessel in the same direction or in the reverse direction to the direction from that in which the settler product was introduced into the immobilization vessel.

10. The method of claim 8 wherein the backwash fluid is any liquid appropriate for the temperature and pressure operating conditions of the immobilization vessel.

11. The method of claim 1 wherein the solid particles are catalytic.

12. The method of claim 11 wherein the catalytic particles are cobalt-based Fischer-Tropsch catalyst, iron-based Fischer-Tropsch catalyst, or a combination thereof.

13. The method of claim 12 wherein the catalytic particles comprise iron carbide.

14. The method of claim 11 wherein the fluid comprising liquid and the first solids content comprises a Fischer-Tropsch product slurry comprising Fischer-Tropsch liquid hydrocarbons and catalyst particles, and wherein the method further comprises introducing a synthesis gas-containing stream into a Fischer-Tropsch reactor, wherein the Fischer-Tropsch reactor comprises solid particles of Fischer-Tropsch catalyst and is operable for the production of Fischer-Tropsch liquid hydrocarbon product, and removing from the Fischer-Tropsch reactor the Fischer-Tropsch product slurry.

15. The method of claim 1 further comprising upgrading the immobilization unit product via at least one selected from hydrotreating processes, hydrocracking processes, and isomerization processes.

16. The method of claim 15 wherein the upgrading produces a clean fuel selected from jet fuel, diesel, naphtha or a combination thereof.

17. The method of claim 1 wherein the immobilization unit product is suitable as fuel.

18. The method of claim 1 further comprising introducing the immobilization unit product into at least one separation process whereby a chemical product is obtained.

19. The method of claim 18 wherein the chemical product is selected from the group consisting of olefins, alcohols, other oxygen containing components, and combinations thereof.

20. The method of claim 1 wherein the solids content of the immobilization unit product is less than 1 ppm-wt.

21. The method of claim 1 wherein the solids content of the settler product is less than 1000 ppm-wt.

22. The method of claim 1 wherein the settler product is introduced into a top portion of the immobilization unit.

* * * * *